United States Patent [19]

Bers

[11] 4,292,125
[45] Sep. 29, 1981

[54] SYSTEM AND METHOD FOR GENERATING STEADY STATE CONFINING CURRENT FOR A TOROIDAL PLASMA FUSION REACTOR

[75] Inventor: Abraham Bers, Arlington, Mass.

[73] Assignee: Massachusetts Institute of Technology, Cambridge, Mass.

[21] Appl. No.: 935,227

[22] Filed: Aug. 21, 1978

[51] Int. Cl.$^3$ .............................................. G21B 1/00
[52] U.S. Cl. ..................................................... 176/3
[58] Field of Search ............................... 176/3, 7, 9, 5

[56] References Cited

PUBLICATIONS

Physics Today (5/79) pp. 25–32, Murakami et al.
Czech. J. Phys. B. 26, pp. 638–645 (1976), Klima.
Plasma Phys. vol. 15, p. 1031–1038 (1973), Klima.
Plasma Physics, vol. 17, p. 463 14 471 (1975), Klima et al.

*Primary Examiner*—S. A. Cangialosi
*Attorney, Agent, or Firm*—Arthur A. Smith, Jr.; Mark G. Lappin

[57] ABSTRACT

A system for generating steady state confining current for a toroidal plasma fusion reactor providing steady-state generation of the thermonuclear power. A dense, hot toroidal plasma is initially prepared with a confining magnetic field with toroidal and poloidal components. Continuous wave RF energy is injected into said plasma to establish a spectrum of traveling waves in the plasma, where the traveling waves have momentum components substantially either all parallel, or all anti-parallel to the confining magnetic field. The injected RF energy is phased to couple to said traveling waves with both a phase velocity component and a wave momentum component in the direction of the plasma traveling wave components. The injected RF energy has a predetermined spectrum selected so that said traveling waves couple to plasma electrons having velocities in a predetermined range Δ. The velocities in the range are substantially greater than the thermal electron velocity of the plasma. In addition, the range is sufficiently broad to produce a raised plateau having width Δ in the plasma electron velocity distribution so that the plateau electrons provide steady-state current to generate a poloidal magnetic field component sufficient for confining the plasma. In steady state operation of the fusion reactor, the fusion power density in the plasma exceeds the power dissipated in the plasma.

6 Claims, 9 Drawing Figures

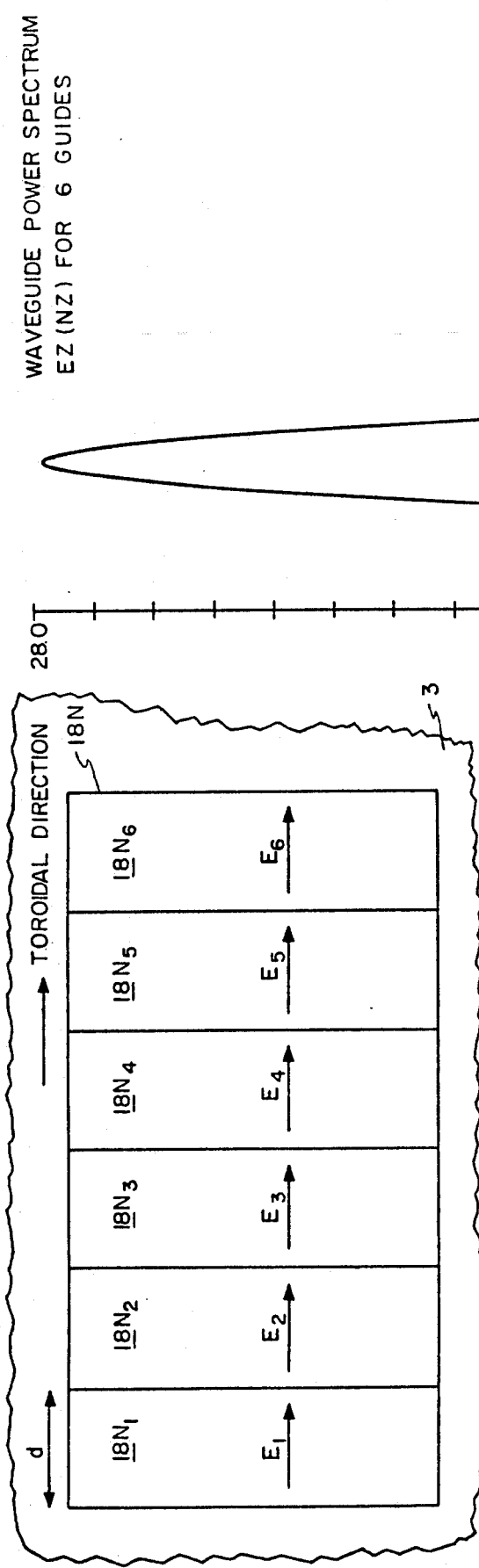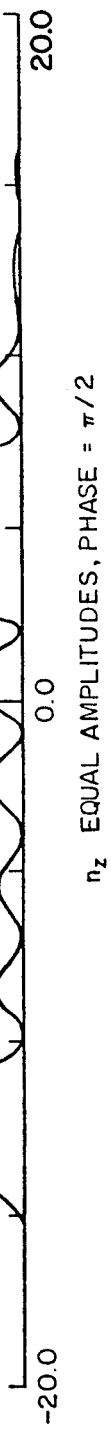
FIG. 5
$E_n = E_o \cos(wt - n\pi/2) \hat{z}$
FIG. 6
WAVEGUIDE POWER SPECTRUM
$E_Z(N_Z)$ FOR 6 GUIDES
EQUAL AMPLITUDES, PHASE = $\pi/2$

SYSTEM AND METHOD FOR GENERATING STEADY STATE CONFINING CURRENT FOR A TOROIDAL PLASMA FUSION REACTOR

The Government has rights in this invention pursuant to Contract EG-77-C-01-4107 awarded by the Energy Research and Development Administration, now the Department of Energy.

The present invention relates to systems for achieving nuclear fusion.

A number of writings are listed in this paragraph to serve as background for the explanation hereinafter, the writings listed here being merely representative: "The Plasma Studies on a Traveling Wave Setup" (Borzunov et al), *Soviet Physics-Doklady*, Vol 8, No. 9, March, 1964, pp. 914–916 (called "Borzunov et al (1964)" herein); "Preliminary Experiment on the Current Sustaining in a Magnetized Toroidal Plasma" (Hirano et al) *Physics Letters*, Vol. 36A, No. 3, Aug. 30, 1971, pp. 215–216 (called "Hirano et al (1971)" herein); "Induction of DC Current by an RF Travelling Wave in a Strong Magnetic Field" (Midzuno), *Journal of the Physical Society of Japan*, Vol. 34, No. 3, March, 1973, pp. 801–805 (called "Midzuno (1972)" herein); "The Peristaltic Tokamak" (Wort), *Plasma Physics*, Vol. 13, pp. 258–262 (called "Wort (1970)" herein); "Plasma-Current Multipole Experiments" (Ohkawa et al), *Physical Review Letters*, Vol. 22, No. 24, June 16, 1969, pp 1275–1277 (called "Ohkawa (1969)" herein); "New methods of driving plasma current in fusion devices" (Ohkawa) *Nuclear Fusion*, Vol. 10, p. 185 (1970) (called "Ohkawa (1970)" herein); "Steady-State Operation of Tokamaks by r-f Heating", General Atomic Project XX 4356.007 and 0.001 (Ohkawa), Feb. 23, 1976 (called "Ohkawa (1976)" herein); "DC Current in the Collisionless Limit Induced by a Travelling Wave—A Calculation Based on Collision Term" (Midzuno et al) *IPPJ*-284, March 1977; "Landau Damping of Low and High Power Slow Electrostatic Waves" (Paoloni et al), September 1977, *PPPL*-1372, Plasma Physics Laboratory, Princeton University; "Tokamak as a Possible Fusion Reactor—Comparison with other C.T.R. Devices" (Golovin et al), 1969 (called "Golovin et al (1969)" herein); A. Bers and C. F. F. Karney, M.I.T. Progress Report 114, p. 123, 1974 (called "Bers and Karney (1971)" herein; P. Lallia in Proceeding of the Second Topical Conference on RF Plasma Heating (Texas Tech University, Lubbock, Texas, 1974), paper B4 (called "P. Lallia (1974)" herein); M. Brambilla, in Proceedings of the Third Symposium on Plasma Heating in Toroidal Devices, Varenna-Como, Italy (Editrice Compositori, Bologna, 1976) p. 83 (called "Brambilla (1976)" herein); R. R. Parker, M.I.T. Quarterly Progress Report No. 102, p. 197, 1971 (called "Parker (1971)" herein); A. A. Vednov, "Theory of a Weakly Turbulent Plasma" in *Review of Plasma Physics*, Vol. 1, Consultants Bureau, New York, 1965, (called "Vednov (1965)" herein); "Confining and Heating a Toroidal Plasma with RF Power" (Fisch), Ph.d. thesis, Department of Electrical Engineering and Computer Science, Massachusetts Institute of Technology, Feb., 1978 (called "Fisch thesis" herein); "Confining a Tokamak Plasma with RF Driven Currents" (Fisch, March 1978); "Current Generation by High Power RF Fields" (Fisch et al); "A Steady State Toroidal Reactor Driven by Microwave Power in the Lower-Hybrid Range of Frequencies" (Bers et al); "A Lower Hybrid Heating System for an Ignition Tokamak" (Brooks et al). See, also, Coppi et al U.S. Pat. No. 3,778,343.

In Golovin et al (1969) it is said that "investigations on controlled nuclear fusion were started in 1950 with the examination of different reactor models." The proposal in Golovin et al (1969) relates to tokamak reactors. Although other proposals for nuclear fusion have been made, the present disclosure is concerned with those systems that employ toroidal plasmas; originally they were ZETA reactors and stellerators and, more recently, tokamaks. In general, the former systems operate in a pulsed mode and involve two distinct operations: (1) generating toroidal currents in a toroidal plasma and (2) heating the toroidal plasma. The prior systems, as discussed in the above-mentioned writings and elsewhere, are now taken up.

The classical way of generating a current in a toroidal plasma is by means of transformer action in which the plasma acts as the secondary coil and load and the primary coil is pulse-energized to produce a time-varying flux linkage through the plasma. This was used originally in ZETA and in stellerators, and is currently used in all tokamaks.

The generation of toroidal current by induction has the disadvantage of not being a steady-state mechanism. Prior to the present system, schemes for producing a steady-state current may be classified by their use of four main physical principles:

(a) Traveling magnetic field or "transit-time pumping."

(b) Particle injection;

(c) Trapping-detrapping in banana orbit; and (d) Bootstrap current.

Scheme (also has mentioned in the literature as early as 1952, Thoneman et al (1952). It relies upon the production of traveling waves which act as magnetic mirrors which accelerate electrons up to the phase velocity of the wave. These waves are produced by external coils wound around the device minor cross-section. Thoneman et al (1952) and later Borzunof et al (1964) and Hirano et al (1971) experimentally produced a current based on this principle. Midzuno (1972) and Wort (1970) explained the current production as a result of net wave momentum being quickly absorbed by the bulk electrons thereby resulting in a largely maxwellian electron velocity distribution centered about an electron drift velocity.

Midzuno (1972) and Wort (1970) performed calculations indicating the usefulness of this scheme for confining reactor type plasmas. Midzuno (1972) indicated that unless a very high Q-value of the coil system is obtained, the wave would have to be intermittently applied in order to be feasible. Wort (1970) pointed out that a similar magnetic wave scheme must be applied to retard the ions to insure that they do not eventually acquire enough drift to cancel the electron current. Wort (1970) also recognized the engineering difficulty of placing coils in a reactor machine which always implies severe neutron bombardment.

Scheme (b) was discussed in Ohkawa (1970) which proposed the injection of unidirectional neutral beams into a plasma such that the beams are slowed down primarily by electrons. The momentum gained by the electrons results in an electron drift velocity and current. However, as the beam slows down, the ions begin to participate equally with the electrons in the absorption of the beam momentum. This large transfer of momentum to the ions necessitates, as Ohkawa (1970)

pointed out, the injection of a second beam in the opposite direction. This second beam is slow enough that it does not produce a current (i.e., it slows down equally on ions and electrons), but it is large enough to balance the overall plasma momentum produced by the first beam. Ohkawa (1970) showed that this scheme can produce current in reactor plasmas using powers less than the fusion output but admitted that serious stability problems are likely.

Ohkawa (1970) proposed scheme (c). That scheme relies upon RF heating of electrons in the direction perpendicular to the toroidal magnetic field in such a manner that they may become trapped in banana orbits. The RF electric field of these waves must be perpendicular to the toroidal magnetic field. The transfer of momentum to the electrons occurs because only electrons with one direction of parallel momentum are perpendicularly heated. The heating and ensuing trapping results in a preferential loss of momentum to the magnetic field.

Method (d), the "bootstrap current," relies upon the diffusive streaming of particles from the plasma center to the outside. Currents are induced when these particles interact with the poloidal magnetic field in such a manner that small poloidal fields become magnified.

The disadvantages of the former methods of obtaining steady-state current have, in the main, been recognized in the writings above. The disadvantages of scheme (a) are primarily; one, it is necessary to locate the coils in close proximity to the plasma and hence subject them, in a reactor environment, to severe neutron bombardment. Two, if the calculation in Midzuno (1972) is realistic, then availability of extremely high Q-value coils is necessary—if these are not available then the system must be pulsed and cannot be considered steady-state. Three, since the current is drawn out in the bulk electrons which drag on the bulk ions, the ions can eventually acquire a drift comparable to the electron drift and thereby cancel the electron current. The idea of Wort (1970), to transmit-time pump the ions in the opposite direction, implies the complication of two sets of coils. Four, in general and especially if the ions must indeed be pumped in the opposite direction to the electrons, the plasma may be unstable to microinstabilities. Five, the propagation and penetration of magnetic traveling waves in large reactor type plasmas may create serious limitations on the use of this method.

The disadvantages of scheme (b), particle injection, specifically revolve around the impossibility of injecting the particles at all. In that scheme, a neutral beam is injected with a large toroidal momentum component. Present reactor studies indicate that perpendicular injection of neutrals, let alone the idea of parallel injection, presents serious penetration problems; it would mean that a current could be extracted only at the outside of the tokamak (or other device) minor cross-section. Such a configuration would be MHD unstable. The geometrical problems become even more difficult since two counterstreaming beams are to be used, one slow and one fast. Obviously, they cannot both deposit their momentum equally and in delicate balance along the whole minor cross-section. Furthermore, many MDH instabilities and microinstabilities are likely to occur in the type of geometry that Ohkawa (1969) proposed. The present lack of resolution of the problem of microinstabilities is admitted in Ohkawa (1970).

Scheme (c), the trapping and detrapping of electrons by perpendicular RF heating, relies upon the penetration of a wave that heats the electrons only perpendicularly. The proposed wave makes use of the electon cyclotron resonance. As noted in Ohkawa (1970), these waves will not penetrate if the plasma frequency is too large. A more serious problem is the lack of availability of high power sources at such a high frequency. Ohkawa (1970) also recognized the problem of charge separation in a non-uniform plasma; the solution to the problem proposed in the writing is heating at the ion-cyclotron resonance, which again requires waves with appropriate propagation characteristics. Even if the method in Ohkawa (1970) is physically valid, and even if the waves needed can be economically generated while penetrating the plasma, the current formed is, of necessity, primarily localized to the outer surface of the tokamak. This is because most of the trapped particles which are indispensible to the scheme, are always located on the outer rim of the minor radius. A current generated in this manner will not maintain plasma stability.

The disadvantages of scheme (d), the bootstrap current, are obvious. The scheme does not operate in a tokamak with too high a collisionality, which renders it invalid for most serious laboratory and reactor parameters. In most present day tokamaks it is not seen to be a very important effect. Furthermore, it relies upon a generation of plasma in the center of the tokamak, a very unlikely occurrence at reactor temperatures and sizes. This current scheme has not been taken seriously as a replacement for the ohmic current.

The main difference in confining the plasma between the technique of the present invention and all the previous schemes considered here is that the present invention does not rely upon the bulk electrons to provide the plasma confining current. Instead, the present system, as later discussed in detail, draws out from the bulk a stream of a few, but very fast, electrons (as opposed to many slow electrons) to provide plasma current. These fast electrons provide a relatively large perturbation to the normally maxwellian distribution in the plasma. A side effect, which has been calculated (see the Fisch thesis), is that the bulk electrons, in fact, acquire an overall drift relative to the bulk ions, but the electric current thereby generated in the bulk is small compared to the electric current generated by the fast electrons. It should also be pointed out that the method with which this electric current is extracted differs in an essential manner from any of the other schemes in that it is nonlinear. Exactly what is meant by nonlinear will be elucidated later in the discussion of the physical basis of the present invention. For now, the essential point is that unless the power levels are carefully picked, fast electrons will not be produced effectively.

The fact that the current is generated by fast particles from a relatively large perturbation of the maxwellian distribution, rather than simply by a drifting maxwellian, has a number of unique consequences. The most important consequence is that current produced by fast particles does not see as large a plasma resistance as current produced by slow particles. This means that the fast particle current, or as it is later called, the plateau current, may be sustained with less power input compared with the same magnitude current produced by slow particles.

A second unique consequence of the large perturbation of the electron distribution is that high phase velocity waves (compared with electron thermal velocity, e.g. $v_{phase} \approx 3v_{th}$ or more) may be employed effectively in the plasma. As a result, waves of different types and over a much broader spectrum may be used. The advantage of this versatility will be discussed later.

The scheme herein proposed also differs from all the other schemes of electric current generation in its reliance on an electrostatic electric field parallel to the magnetic field.

The unique principles of the present system manifest themselves also in that it is the only scheme which can easily make use of waveguides which conduct waves particularly efficiently in the vicinity of the lower hybrid frequency. This is to be contrasted to the use of coils, waves near the electron cyclotron frequency, or ion beam injection.

A further differentiation of the present scheme from all the other schemes is that it is possible for apparatus of the present invention to control the profile of the current over the minor radius. This versatility has consequences even for plasmas not primarily confined by the present apparatus.

Accordingly, it is an object of the present invention to provide a system of steady-state toroidal electric currents in the plasma for a fusion device serving to confine the plasma.

Another object is to provide the possibility of depositing heat or generating currents with the same apparatus in devices not of primary interest here, but in order to control the temperature and current profiles of the plasma in other devices, thus improving, for example, their stability.

These and still further objects are addressed hereinafter.

The foregoing objects are achieved, generally, in apparatus wherein RF energy is employed to generate steady-state toroidal electric currents in a toroidal plasma; the electric currents, thus generated, serve to heat the plasma and they serve, as well, to confine the plasma. Means is provided to prepare a hot toroidal plasma having the characteristics n in the range $10^{+13}$ to $10^{+15}$ cm$^{-3}$ and T greater than 1 keV, wherein the terms n and T are the plasma density and the plasma absolute temperature, respectively. Further means is provided to introduce RF energy of very long duration, that is, essentially steady-state, to the plasma to couple to electrons having velocities greater than the electron thermal velocity of the plasma. The phasing of the RF energy is such that substantially all the parallel wave momentum of the RF energy is unidirectional and the intensity is such that a perturbation from the normally maxwellian distribution is produced in velocity space of high-energy electrons which establishes a steady-state electric current I necessary for confinement of the plasma. Generally, this perturbation is referred to below as a raised plateau, the plateau in some embodiments relatively flat, although in other embodiments, it may vary from being flat. In addition to generating a confining magnetic field for the plasma, the high-energy electrons in the raised plateau also transfer energy by collisions to the bulk electrons, that is, the electrons in the plasma moving at about or less than the electron thermal velocity of the plasma, and from the bulk electrons to the bulk ions of the plasma to effect the necessary steady-state heating of the plasma. Once the RF energy has been introduced to the plasma, the mechanism that initiated or created the plasma is turned off.

The invention is hereinafter described with reference to the accompanying drawings in which:

FIG. 1A is a graph showing, by the solid-line portion thereof, maxwellian distribution of electron velocity parallel to the magnetic field in a hot toroidal plasma wherein a broad plateau is quickly generated by RF energy introduction to the plasma in accordance with the present teachings, the plateau of limited height being the broken-line portion of the graph, the number of plateau electrons being less than in true steady-state;

FIG. 1B is a graph, like the graph of FIG. 1A, wherein, for reference, the solid-line portion represents the initial maxwellian distribution of electron velocity in a hot plasma, the true steady-state distribution being represented by the broken line portion, the plateau now being higher or "raised" in the later figure because of diffusion of electrons thereto from the bulk of the plasma, as indicated by the further broken-line portion of the graph into the bulk region;

Figure 3:
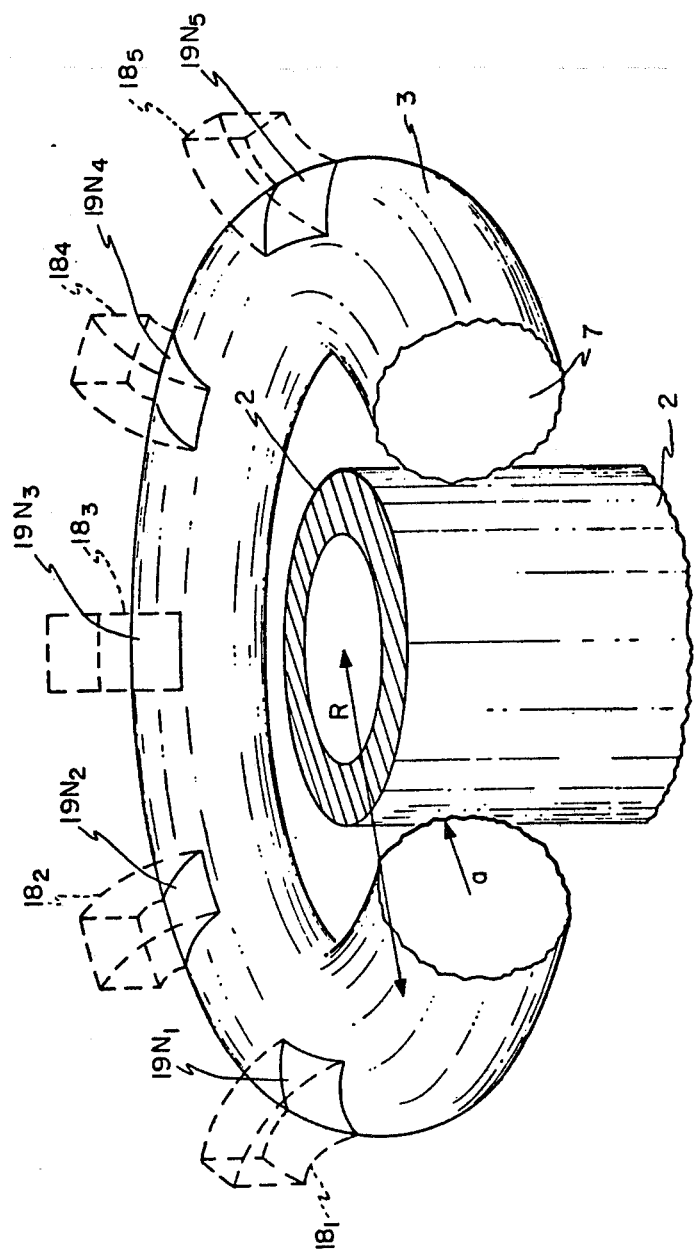
FIG. 3 is a diagrammatic isometric view of a portion of the apparatus of FIG. 2 and includes an annular housing within which a toroidal plasma is generated and six input ports and waveguides (of a total of eight) to introduce RF wave energy to heat and confine the plasma.
Figure 4A:
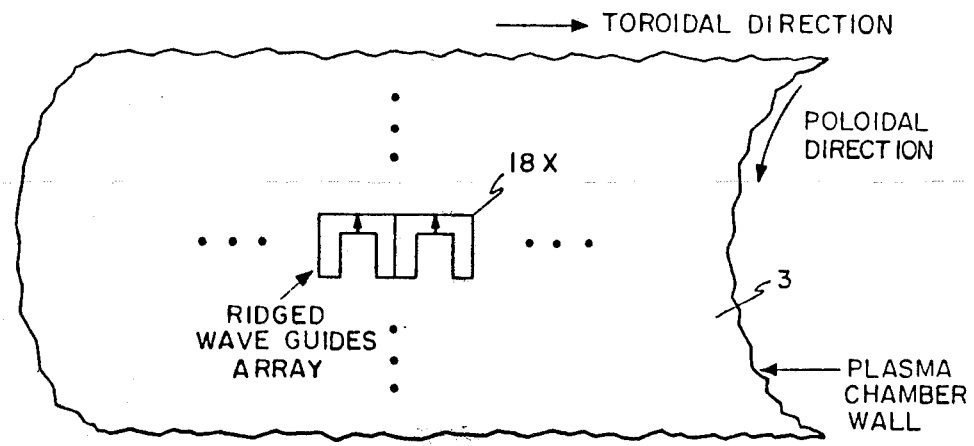
Figure 4B:
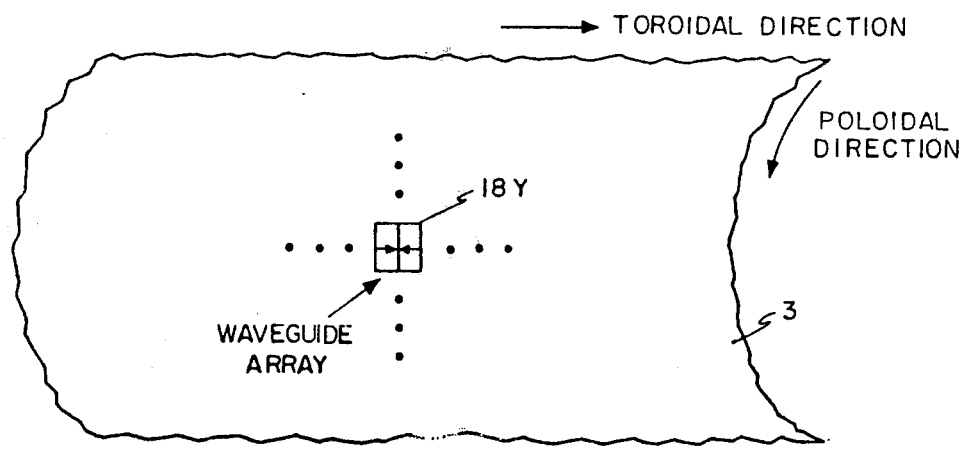
Figure 4C:
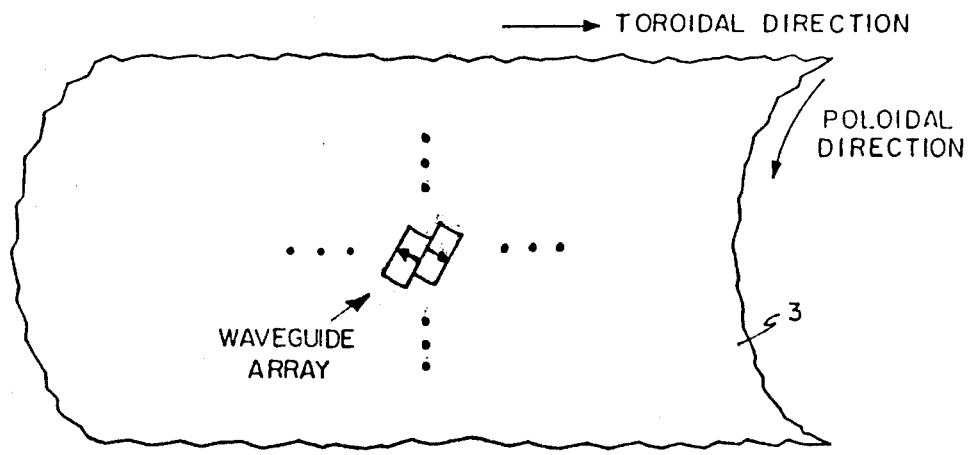

FIGS. 4A, 4B and 4C show waveguide cross-sectional configurations that the waveguides of FIG. 3 may take; and FIG. 5 shows orientation and one waveguide array with respect to the housing of FIG. 3 to provide appropriate phasing of the RF energy to effect coupling to electrons in the plasma at and above the electron thermal velocity of the plasma, an example of such phasing being given in the caption; and FIG. 6 is a graph showing RF power versus $n_z$ of electromagnetic waves at the mouth of a waveguide such as that in FIG. 5, wherein $n_z \equiv$ speed of light divided by the wave parallel phase velocity.

Some remarks of a general nature are in order at this juncture. As is discussed in great detail hereinafter, in the present system a plasma is both confined and heated to thermonuclear characteristics for continuous production of controlled thermonuclear fusion energy by high-power, RF energy (the term "RF" is used herein as a generic abbreviation to denote high frequency electromagnetic wave energy). The plasma in the first instance can be prepared in a tokamak system of the type disclosed, for example, in the Coppi, et al. patent. The Coppi patent describes a device (called Alcator) made and operated at the Massachusetts Institute of Technology, which provides very high temperature plasma, that is, plasma having the characteristics $n \sim 10^{+14}$ cm$^{-3}$ and $T \sim 1-3$ keV, wherein the terms n and T are the plasma density and the plasma absolute temperature, respectively. It was found in that device that the classical theories of the relationship between plasma resistances and temperature, i.e. the plasma (parallel) conductivity $T^{3/2}$, are correct. Based on this observation, some mechanism to effect heating of the plasma, including the introduction of microwave RF energy has been proposed. However, the introduction of such RF energy was achieved in a manner causing turbulence in the plasma, resulting in plasma heating. The prior art RF techniques did not generate steady-state electric currents as is done in the present system, which steady-state currents serves mainly to confine the plasma. Further, even the heating resulting in accordance with the present teaching differs from the conventional mode of heating by RF energy.

More specifically, in accordance with the present invention, the high-power RF energy fields introduced to the prepared plasma generate an electron current on the "tail" of the plasma electron velocity distribution function. The electrons in this tail have velocities a few times, e.g. three to six, the thermal velocity. The magnitude and shape of this current establish a magnetic field in the poloidal direction ($B_p$ herein), which acts together with an externally produced toroidal field ($B_T$ herein) to confine the plasma.

In addition, the introduced RF energy fields heat the plasma electrons by power dissipated through collisions of the "tail" current electrons with the "bulk" electrons (i.e. with electrons at velocities equal to or less than the thermal velocity). The bulk electrons then transfer their energy to the ions also via collisions. By means of this heating, the ions may reach the necessary temperature for thermonuclear reactions to occur. In some embodiments, additional means for heating the plasma to ignition may be necessary to supplement to tail current heating.

Thus, the purpose of the invention is to provide a new apparatus primarily for confining a plasma, with incidental and, in some cases, necessary heating in a toroidal geometry with high-power RF fields applied externally in a proper fashion. This allows one to produce with CW (continuouswave) RF power sources a steady-state, controlled thermonuclear reaction. The emphasis of the present invention is that the plasma confinement is achieved with a relatively low input power requirement.

Figure 1A:
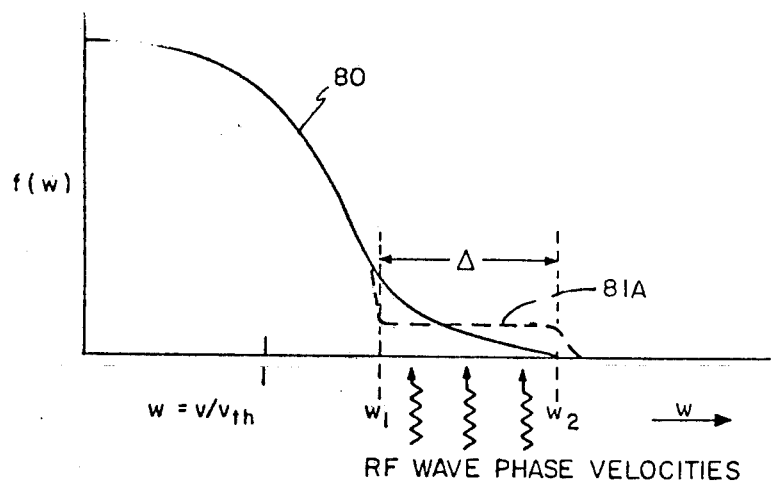
Figure 1B:
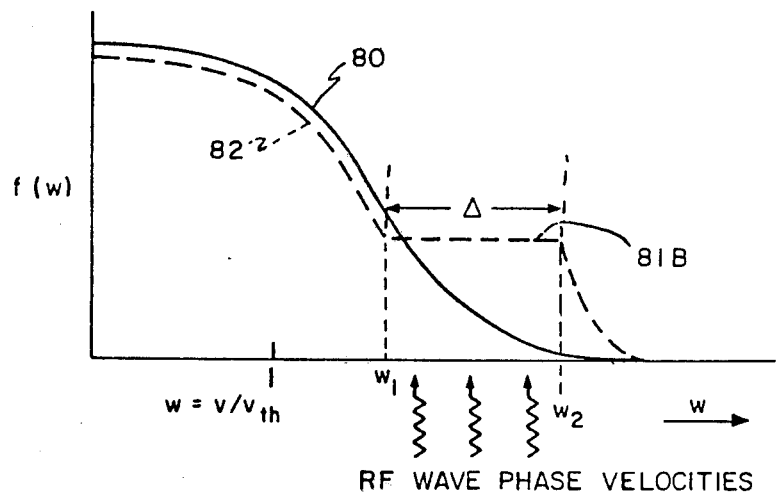

The ideas just expressed are now gone into in greater depth with reference to FIGS. 1A and 1B; the mechanism by which the effect depicted in these two figures represents the maxwellian distribution of electron velocity in a hot toroidal plasma of the type, for example, generated in the Alcator device at M.I.T. Normally, such a plasma has a maxwellian distribution of electrons in velocity space. This distribution is shown as a function of w, the electron velocity normalized to the thermal velocity $v_{th}$ in the plasma, and is shown as current 80 in FIGS. 1A and 1B. w=1 (i.e. the point labeled 1 in FIGS. 1A and 1B) is the point on the curve 80 representative of the plasma thermal velocity $v_{th}$.

According to the present teaching, RF energy of very long duration, that is, essentially steady-state, is introduced to the plasma to couple to the plasma, the phasing, as later shown, being such that substantially all the parallel wave momentum of the RF energy is unidirectional and the intensity is such that a wide plateau 81A (of width $\Delta$) in FIG. 1A is produced in velocity space of high-energy electrons; that is, the plateau electrons are those electrons in the region of the curve between $w_1$ and $w_2$, wherein $w_1$ and $w_2$ are respectively the lowest and the highest phase velocity in the RF wave spectrum in the plasma normalized to the plasma thermal velocity $v_{th}$. The plateau as shown in FIGS. 1A and 1B is relatively flat-topped. In other embodiments, differing shaped plateaus may be established. The tail of the plasma electron distribution function referred to above is that region of the curve 80 wherein w 1 (e.g. is at least greater than three) and the term bulk refers to the region of the curve 80 wherein $w \leq 1$.

The raised plateau in FIG. 1B is labeled 81B and differs from 81A only in being higher, that is, the wave 81B represents a situation in which more electrons are in the region between $w_1$ and $w_2$ than represented by 81A. There is also shown in FIG. 1B a broken-line representation numbered 82 in the bulk of the plasma, blending into the raised plateau 81B. The line 82 represents a condition whereby electrons in the bulk of the plasma, i.e. to the left of the plasma thermal velocity, diffuse therefrom to the raised plateau 81B. The electrons in the raised plateau 81B provide a high current I serving both to confine the plasma and to heat the plasma, as now explained.

The plasma is confined, in part, by the toroidal magnetic field ($B_T$ herein) and, in part, by the poloidal field ($B_p$ herein). The electrons in the region from $w_1$ to $w_2$ are high velocity electrons and, hence, create a high current; that high current sustains a poloidal magnetic field $B_p$ which together with the externally produced toroidal field $B_T$ (and possibly additional vertical fields) confine the plasma.

The plasma current I is primarily due to the high-energy electrons in the raised plateau region of the plasma. These electrons transfer energy by collisions to the bulk electrons, that is, the electrons in the plasma moving at less than the electron velocity of the plasma. The bulk electrons in turn transfer energy by collisions to bulk ions of the plasma, heating the plasma ions.

An RF drive current differs importantly from an inductively driven (i.e., ohmic) current in that there is no dc electric field in steady-state operation in the RF system. This is because the current is forced volumetrically rather than, as through a resistor, from a boundary. In a resistor, current carriers are slowed down, while the current remains divergence free. This implies a charge bunching which supports an electric field. In contrast, a volumetrically driven current does not produce charge bunching. However, as the RF current is turned on in a tokamak, as later discussed, it does generate a time-varying magnetic field, which, in turn, induces a toroidal dc electric field that opposes the motion of the plateau electrons. The dc field instantaneously produces a counter-current of electrons, primarily in the bulk of the velocity distribution (since most electrons are situated there) so as to oppose any abrupt change in the flux linkage to the plasma. The counter-current decays in an L/R time of the tokamak, where L and R are the plasma inductance and resistance, after which the RF current flows in the absence of the dc field.

Whenever very intense RF power is turned on, there is, initially, very little RF current, since the number of electrons initially in the resonant region is quite small. One can define an RF current turn-on time, $\tau_{to}$, occurring on a collisional time scale, during which bulk electrons are collisionally scattered into the resonant region to form the raised plateau that is characteristic of the time-asymptotic distribution (see FIGS. 1A and 1B). If $\tau_{to}$ is less than L/R, then both the RF plateau current and bulk countercurrent are turned on in a time $\tau_{to}$, but the total current does not change, although the dc electric field is effectively shut off. In the event that the RF current exceeds the original ohmic current in less than an L/R time, the RF current will begin to drive the primary transformer coils in reverse. In steady-state tokamak operation, it is desired to switch from the ohmic current to the RF current; after a turn-on time the ohmic coils should be disconnected. It should be noticed that in the steady-state operation, the absence of a dc electric field implies that no runaways are produced. (An equivalent circuit is presented at page 24 of the Fisch thesis.)

The turn-on time $\tau_{to}$ calculated in the Fisch thesis, is approximately $\Delta w_1^2/\nu_c$ seconds, where $\nu_o$ is the 90° collision frequency for electrons in the plasma. This time is typically a few microseconds. There now follows with reference to FIG. 2 an explanation of a structure to effect the required results; the structure in FIG. 2 is exemplary only.

Figure 2:
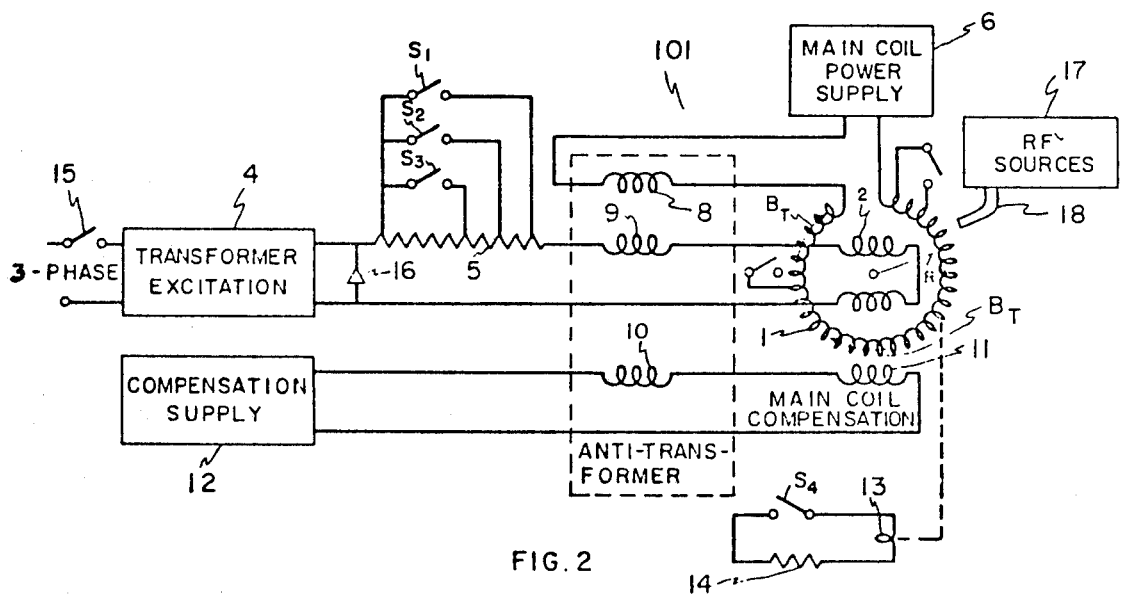
FIG. 2 is a schematic circuit diagram, partly block diagram in form, of apparatus adapted to provide the functions in accordance with the present teachings.

The apparatus labeled 101 in FIG. 2 is to generate steady-state electric currents in the plasma of a fusion device for confining and heating the plasma. The system 101 includes a toroidal coil 1 (which may consist of Bitter plates as in the Coppi et al patent, or superconducting coils) energized by a dc power source 6 to create the toroidal magnetic field $B_T$. The coil 1 is wound about an annular housing 3 in FIG. 3 (the coil 1 is not, however, shown in FIG. 3) that contains in a cavity 7 the gaseous deuterium and trititium mixture used in the fusion process. An air-core transformer or coil 2 serves to create a current and, thus, prepare the plasma. The coil 2 is energized prior to the experiment by a dc power supply 4 and is then rapidly discharged by introducing a resistor 5 into the circuit. The rapid discharge creates a large changing magnetic flux linking the gas within the annular cavity 7. The gas at this juncture is ionized and conductive making it effectively a single turn secondary of a transformer whose primary is the coil 2. During the whole operation, of course, the toroidal field $B_T$ is present. The switches designated $S_1$, $S_2$ and $S_3$ in FIG. 2 permit changes in the rate of decay of the magnetic field within the cavity 7. Anti-transformers 8, 9 and 10 and a main coil compensation coil 11, energized by a compensation supply 12, serve to compensate for the various stray fields in the device 101, as does also a copper stabilizing shell 13. A resistor 14 and switch $S_4$ serve to dissipate some magnetic energy associated with plasma current.

The sequential steps followed are: first, the coil 2 is energized by closing the switch $S_1$ and a switch 15 to a three-phase power supply; next the switch 15 is opened and then the switch $S_1$ is opened introducing the resistor 5 into the circuit and causing rapid decay of the excitation current and abrupt rise of a plasma current; next, and before collapse of the excitation current, the switch $S_2$ is closed, removing most of the resistance 5 from the circuit, reducing the rate of collapse of the excitation current and leveling off the plasma current; next the switch $S_3$ is closed to reduce further the excitation current collapse and maintain the level of plasma current, the induced current in the system passing, in each condition, through a free-wheeling diode 16. The plasma current thusly generated is an ohmic current. In terms of this specification, the toroidal plasma is prepared, and at or about this juncture RF energy is introduced to the plasma from RF source 17 through waveguides 18. (It will be appreciated from the explanation in later paragraphs that the numeral 17 represents a plurality of RF sources and that the numeral 18 represents a plurality of waveguides or, more precisely, waveguide sets, spatially distributed about the chamber 3 with access through ports in the chamber wall to the cavity 7 in FIG. 3.) At this juncture, the ohmic current is turned off, the plasma current being maintained and increased by the RF energy.

In the scheme disclosed herein, the heating of the bulk of the plasma, as above indicated, comes from the energy transfer via collisions between the high-energy (greater than thermal) electrons in the raised plateau and the low-energy (thermal) bulk electrons. These in turn heat the bulk of the ions, also by collisions. The energy flow is from the external RF power sources 17 to the wave fields in the plasma, for maintaining of the raised plateau of high-energy electrons, which in turn transfer their energy to the bulk electrons and ions of the plasma, as described. The RF sources 17 are of very long pulse duration, essentially CW (continuous wave) so as to allow the operation of an essentially continuous thermonuclear power generation reactor.

To place the explanation at this juncture in context, the system depicted, in part, in FIG. 3 is a housing with eight ports (of which five ports $19N_1$–$19N_5$ are shown) into the annular cavity 7. Associated with each port is a waveguide set, that is, the waveguide sets shown at $18_1$ ... associated with the ports $19N_1$ .... Each waveguide set $18_1$ ... consists of waveguide arrays which, in turn, are composed of a plurality (e.g., six) of waveguides (as shown, for example, in FIG. 5), sized and phased to give the desired RF wave in the cavity 7, the total number of waveguides per port being, for example, about one hundred. The major radius R of the toroidal housing 3 in FIG. 3, as later discussed, may be 1.5 meters and the minor radius a fifty centimeters; the ports $19N_1$ ... have toroidal dimensions of ten centimeters and azimuthal dimensions of twenty centimeters.

For plasmas of thermonuclear power generation interest (plasma densities in the range $10^{14}$–$10^{15}/cm^3$ and temperatures ranging from 6 keV, ignition, to 10–20 keV, operating), the RF power, typically, would be in the microwave frequency range 1–19 GHz where high-power, megawatt, CW microwave tube sources, at high-efficiencies (50–80%) are readily available. This RF power is brought to the toroidal plasma chamber via the waveguide arrays 18, properly phased and oriented with respect to the magnetic field so as to assure efficient excitation of the required electric fields in the plasma, and within the appropriate phase velocity range where the raised-plateau in the electron distribution function is to be maintained.

Specifically, the waveguide fields must be phased to produce a traveling wave in the direction of the ohmic current which originally generates and heats the plasma but which is turned off once the RF is turned on. The choice of the waveguide dimensions and the number of waveguides is determined by the phase velocity spectrum of the electric fields generated. This is usually in the range of from three to six times the electron thermal velocity, depending upon the amount of heating allowed and the amount of current to be generated. The electric fields in the waveguides must be properly oriented so as to couple efficiently the microwave power from the waveguides to power flow in the plasma waves. For reactor temperature plasmas, this requires coupling to the so-called fast-branch whistler-Alfven wave and the slow-branch lower-hybrid wave. The coupling to the fast wave is accomplished by orienting the waveguide so that the electric field at the mouth of the waveguide is essentially prependicular to the magnetic field confining the plasma (that is, the total field $\vec{B}_T + \vec{B}_p$, where $B_p > B_T$), while coupling to the slow wave requires that the electric field in the waveguide be essentially parallel to the confining magnetic field. The coupling to the fast wave has the advantage that it allows for the excitation and penetration of fields in the plasma at small indices of refraction which are required for high temperature plasmas, while the advantage of the slow wave is that it is easier to set up the required phased-array of waveguides with its orientation. For the fast-wave excitation, an array of ridged waveguides is properly arranged and phased both in the toroidal and poloidal directions of the torus as shown in FIG. 4A wherein the waveguide set shown in designated 18x. For the slow-wave excitation, regular waveguides would be properly arranged in the poloidal and toroidal directions of the torus and phased mainly in the toroidal direction; the waveguide set shown at 18y in FIG. 4B may be used. FIG. 4C shows a configuration having waveguides slanted with respect to the toroidal magnetic field. This configuration is adapted to excite both the whistler-Alfven wave and the lower hybrid wave.

The waveguide array labeled 18N in FIG. 5, comprising waveguides $18N_1-18N_6$, is similar to the waveguide array 18y. The width-d of each waveguide of each array, i.e., the waveguide dimension along the toroidal direction, is chosen to be approximately $$d = \frac{\pi v_{th} w_1}{2\omega};$$

where $\omega$ is the wave frequency; typically d is about one centimeter. The arrows designated $E_1 \ldots$ indicate the direction of the electric field in the waveguides and point in the toroidal direction. The relative magnitudes of the electric fields in the six waveguides $18N_1-18N_6$ are given below: (where $\omega$ is the frequency of the RF waves):

---
$E_{18N1} = \cos \omega t$
$E_{18N2} = \cos (\omega t - \pi/2)$
$E_{18N3} = \cos (\omega t - \pi)$
$E_{18N4} = \cos (\omega t - 3\pi/2)$
$E_{18N5} = \cos \omega t$
$E_{18N6} = \cos (\omega t - \pi/2)$
---

A graph of RF power vs. $n_z$ at the mouth of the waveguide, like the waveguides in FIG. 5, is shown in FIG. 6; $n_z \equiv$ speed of light divided by the wave parallel phase velocity. Typically the wave parallel phase velocity is about one half the speed of light.

As an example, for a reactor-like plasma at a temperature of eight to ten keV and plasma density $10^{14}$ to $10^{15}/cm^3$, the electric field spectrum required to generate a plasma current of $4 \times 10^6$ amperes and maintain the plasma heating is designed to have the following characteristics:

(a) The electric field spectrum extends over phase velocities parallel to the confining magnetic field from four to six times the electron thermal velocity ($V_{th}$); this requires that the waveguide dimension parallel to the confining magnetic field, i.e. d, be typically ($v_{th}/f$), where f is the frequency of the chosen microwave source, typically several gigahertz.

(b) The electric field spectrum produces a traveling wave in the plasma with an electric field parallel to the confining magnetic field, and traveling in the direction of the original ohmic current which is to be turned off; this is accomplished by phasing waveguides along the confining magnetic field in a progressive manner (for example, 0, $\pi/2$, $\pi$, $3\pi/2$, $2\pi$, $5\pi/2$, for the six waveguides in an array, as above indicated).

(c) Sufficient total microwave power is supplied and distributed over the area of the toroidal wall; for the reactor example below, the required power is in the range of ten to thirty megawatts, to be distributed over 1% of ½ the toroidal wall surface; this, together with the waveguide dimensions and breakdown considerations, determines how many waveguides in the toroidal and poloidal directions are needed per port, and the number of ports that are required. A representative example is given in FIG. 3 in which eight ports (only six ports are shown in FIG. 3) and 800 waveguides are utilized; that is, each port consists of 100 waveguides.

The present invention is based primarily on the principle of the diffusion of electrons in velocity space in the presence of an electrostatic wave traveling parallel to the magnetic field. If the wave energy in the electrostatic wave is made both intense enough and broad enough, then there is significant distortion of the maxwellian distribution (i.e., the wide raised plateau 81B herein) that the internal collisions among the plasma particles attempt to establish. Thus the present system elicits from the plasma a plateau of electrons traveling at least several times the electron thermal velocity to many times the electron thermal velocity at the most. The plateau then acts as a beam which heats the plasma and, because of its intrinsic current, also confines the plasma. Thus, whereas it might be considered that this system consists of establishing a beam in the plasma with certain desirable properties, it should be made clear that the raised plateau established differs from a beam especially in its greater resistance to microinstabilities.

The raised plateau created in the plasma differs from the usual quasilinear plateau discussed so often in the literature in that it is formed in the presence of a collisional plasma. The collisions tend to destroy the plateau on one hand—Vedenov (1962) discusses the implication of this destruction—but on the other hand the collisions feed the plateau with more particles from the bulk distribution. Thus, after a period of time, a steady-state is reached wherein there are many more plateau electrons. This effect is ignored in Vedenov (1962) wherein attention is concentrated on only a small perturbation of the maxwellian.

The implication of the raised plateau (i.e., 81A and 81B) that is formed is that high current production can be achieved by establishing a broad spectrum of waves in the plasma. It is important to note that if the electron velocity distribution function were not seriously distorted, then waves of the higher phase velocities that are considered here would not be able to deposit their energy and momentum in the plasma, and a broad spectrum would be, in part, wasted.

To be specific, it has been found for present purposes that the current produced by a spectrum of waves (intense electrostatic waves in the plasma with phase velocities between $w_1$ and $w_2$) of the nature proposed here can be described by the equation:

$$I = 6.5 \times 10^5 \, a^2 \eta_x F_2 \left(\frac{\eta}{10^{14}}\right) \left(\frac{T_e}{keV}\right)^{\frac{1}{2}} \text{ kiloamperes,}$$

wherein
a = plasma minor radius in meters,
$\eta_x$ = percentage of minor cross-section that is involved in the current carrying—typically taken to be 0.5,
$F_2 = [(w_2^2 - w_1^2)/2] \, f(w_1)$,
$w = w/kv_{th}$, is the normalized parallel velocity and $v_{th}$ is the plasma thermal velocity (the plasma wave spectrum may be though of as extending over the range $\Delta$ in FIGS. 1A and 1B from $w_1$ to $w_2$, where $w_1$ and $w_2$ are respectively the lowest and the highest phase velocities in the wave spectrum normalized to the plasma thermal velocity $v_{th}$), $$F(w_1) = \frac{1}{\sqrt{2\pi}} e^{-w_1^2/2}$$

is the density of electrons with velocity $w_1$,
n = plasma density in cm$^{-3}$, and
$T_e$ = plasma temperature in electron volts.

In order to establish the current I, it has been found for present purposes that the power dissipated can be described by the equation $$P_D = 3 \times 10^8 \, \eta_v R a^2 F_1 \left(\frac{n}{10^{14}}\right)^2 \left(\frac{keV}{T_e}\right)^{\frac{1}{2}} \text{ kilowatts}$$

wherein
$\eta_v$ = percentage of a tokamak volume over which the power is dissipated—typically taken to be 0.5,
R = tokamak major radius, and
$F_1 = f(w_1) \ln(w_2/w_1)$.

The above computations for the current and power dissipated as a function of the orientation of the wave spectrum in the plasma indicate a fairly specific and unobvious design of an RF-driven tokamak reactor, that will utilize RF power that dissipates enough energy to ignite the plasma while providing enough current to confine it. The above equations assume that the power in the RF waves is large enough to draw out the required plateau. For the designs that are of interest, this condition will always be satisfied. The above equations do not taken into account the fact that the plasma does, in fact, have a temperature and density profile, with both quantities peaked in the center of the minor radius. For the moment, calculations based upon an average density and temperature are sufficient. It should be noted, however, that this scheme can take advantage of the temperature and density profiles in a very important way: by carefully choosing the spectrum orientation to match these profiles, the current may be drawn out at a selected position along the minor radius. This allows the option of choosing the current profile in the plasma.

The following reactor design is suggested as an example and an application of the ideas disclosed above. A steady-state fusion output yield of about 150 megawatts is obtained while supplying a current of about two mega-amperes. (For confinement of alpha particles from the fusion reactor a larger current may be needed to protect the walls of the device.) The power dissipated in the production of the current is about 15 megawatts, small enough to make the scheme economically practical, while large enough to help ignite the plasma by raising its temperature to about 10 keV. The design has the following characteristics:
R = 1.5 meters,
a = 0.5 meters,
n = 4 × 10$^{14}$ cm$^{-3}$,
$w_1$ = 4.1, and
$w_2$ = 6.

The $\beta_p$ ($\beta_p$ = ratio of plasma pressure to poloidal magnetic field pressure) of this design is taken equal to three and the $\beta_T$ ($\beta_T$ = ratio of plasma pressure to toroidal magnetic field pressure) is about 2%. The safety factor q, is four.

The plasma is then in the macroscopic sense, in equilibrium and stable. The wave spectrum in the plasma is excited utilizing both lower-hybrid and whistler-Alfven waves in their respective regions of accessibility.

The intensity of the plasma RF energy needed to heat and confine in accordance with the present teaching must be adequate to maintain a substantially flat plateau in FIG. 1B over its entire width $\Delta$, said plateau coinciding in velocity space with the spectrum of phase velocities excited; that is, $D(w) \geq \Delta w^2$, wherein $D(w)$ is the ratio $$\frac{D_{Q.L.}}{D_c},$$

$D_{Q.L.}$ being the quasilinear diffusion coefficient in velocity space due to the RF wave energy and being a function of the phase velocity of the particular wave of said spectrum and $D_c$ being a measure of collisional diffusion in velocity space due to the plasma, and w is the normalized velocity.

In assessing the applicability of the present teaching of steady-state current generation to reactors of arbitrary design, the following conclusion is reached. The currents sufficient for plasma confinement in reactors operating near $\beta_p = R/a$ may be achieved at a power cost $$P_D = \left[\frac{4P_F}{w^2}\right] \left[\frac{10^{14} \text{cm}^{-3}}{n}\right]^{\frac{1}{2}} \left[\frac{10 keV}{T}\right]^{\frac{1}{2}} \left[\frac{\text{meter}^2}{aR}\right]^{\frac{1}{2}},$$

where $P_f$ is the fusion power density for D-T reactions near 10 keV and w is the average wave phase velocity normalized to the thermal velocity. Typical parameters allow $P_D/P_f$ to be small, implying acceptable power dissipation in RF-driven reactors, a conclusion previously thought false because of the incorrect modeling of the current as a single electron fluid (Ohkawa 1970). A particularly attractive possibility is the generation of the current by lower hybrid waves. These waves can be efficiently excited by an endfire waveguide array and can penetrate the plasma center while dissipating a significant fraction of the incident power.

The advantage of the present method of electric current production over any inductive method is, of course, the possibility of constructing a steady-state rather than pulsed tokamak. The advantage of the method over previously proposed steady-state methods primarily resides in the prospect of its feasibility at low power cost and that it does not suffer from the disagreeable features of other designs. In particular the following points of comparison should be noted:

(1) The use of waveguides to excite the electric fields is possible in the present design. This is to be contrasted with the use of coils, which are subject to neutral bombardment, and the use of neutral beams which will not penetrate. Waveguides are a particularly appealing construction for bringing energy into a tokamak: they can easily be interspersed between the toroidal magnets due to their relatively small apertures and may be bent to suit engineering requirements.

(2) The use of RF waves near the lower hybrid frequency, as opposed to the electron cyclotron or higher frequencies, is possible in the design. Microwave power sources with high efficiencies (~70%) and high powers are available in the range of frequencies needed. High efficiencies are not available in neutral beams and high RF power is not available at other frequencies.

(3) The propagation and penetration characteristics of the wave to be used are theoretically documented in a comprehensive manner.

(4) The design feature of a relatively broad spectrum of waves disclosed herein has the advantage that thresholds for unwanted nonlinear and parametric effects, which inhibit the penetration of the waves at high powers, are less likely to occur than in designs incorporating a narrow wave spectrum. Furthermore, the option is available of dividing power among different types of waves, such as the lower hybrid and whistler-Alfven, which may increase the thresholds for the unwanted effects.

(5) This design allows both the confinement and heating of the plasma with one apparatus, which is to be contrasted with other designs that require one apparatus for heating and one for confinement. It also must be contrasted to other designs that require a separate apparatus to retard the ion drift motion.

(6) This is the only design that allows for a sensitive control of the current profile, which can also be used as a stability mechanism to aid other tokamaks not relying primarily on the RF-driven current. It should be pointed out also that a certain measure of control is obtained over the temperature profile.

(7) Because the present system can maintain a current composed of fast electrons that sees less of a plasma resistivity, generation of a current requires less power input than other designs.

Preparation of the plasma prior to introduction of the RF energy to heat and to confine the plasma in accordance with the present teaching may be accomplished by ohmic heating, as above indicated, or by neutral beam heating which is also mentioned previously. Both approaches to heating have been proposed as mechanisms to effect fusion, as well. Ohmic heating is the most commonly used; its main disadvantages in terms of attaining fusion are that it is transient and the plasma resistance decreases as its temperature increases. Neutral beam heating in terms of attaining fusion has the disadvantages that present day neutral beam sources are not sufficiently energetic to penetrate a large cross-section, high-density reactor type plasma, and that such beams are inefficient. It is of some importance to point out differences since ohmic heating and neutral beam heating have been combined and one or the other or both have beem combined with electromagnetic fields; and the latter, like the present invention, uses RF energy.

A toroidal plasma heated, say, by ohmic heating can be heated by electromagnetic fields which are made to penetrate the plasma from external sources of electromagnetic power. Such fields in the plasma induce oscillations in the plasma particles which, in turn, through particle collisions or nonlinear stochastic effects randomize this energy received from the fields, and then the plasma is heated. This type of heating is generally referred to as "RF heating" irrespective of the frequency or scheme of coupling of the electromagnetic power.

"RF heating" has the disadvantage of being complex and difficult to couple directly to the bulk of the plasma particles' velocities, i.e., thermal velocity. In schemes in which the fields are used to generate a low-velocity bulk current, the heating usually has the undesired property of occurring on the plasma periphery (near the wall). The schemes proposed, furthermore, are for heating only—not both heating and confining.

The heating mechanisms of the present invention differ from previous ones in the following important aspects. The main plasma heating in the present invention, as before noted, comes from collisions between the wave generated raised-plateau of the electron velocity distribution function and the electrons in the bulk of the electron velocity distribution function. Thus, it does not use ohmic heating, nor the injection of neutral beams. The se of RF power is in a novel way in that it is used to generate the raised-plateau of high electron-velocities parallel to the toroidal magnetic field rather than to induce oscillations in the bulk electron or ion velocities.

Also, former methods of applying microwave fields to the plasma wall with waveguides are very different for "RF heating" than for present purposes. Originally only single waveguides were proposed Parker (1971) and Parker et al (1974). This has poor penetration characteristics and cannot produce a current. Later, it was proposed to use phased arrays of waveguides for the purpose of plasma heating only (Bers and Karney (1974), P. Lallia (1974), Brambilla (1976). None of these was designed or intended for generating a current in the direction of the ohmic heating current. It should be emphasized, further, that the plasma heating occurring because of the current generating apparatus of the present invention is largely incidental to the main purpose—confinement. In bringing the plasma to ignition, this heating may be used advantageously. The point is that in the steady-state ignited reactor of the present invention, the power cost associated with the heating is small enough that the present confinement mechanism represents an economically attractive option to the tokamak reactor designer.

Further modifications of the invention herein disclosed will occur to persons skilled in the art and all such modifications are deemed to be within the spirit and scope of the invention as defined by the appended claims.

I claim:

1. A system for generating steady-state confining current for a toroidal plasma exceeding the power dissipated in said plasma, comprising:

means for preparing a dense, hot toroidal plasma having a confining magnetic field with toroidal and poloidal components;

means for injecting continuous wave RF energy into said plasma to establish a spectrum of traveling waves in said plasma, said traveling waves having momentum components substantially either all parallel or all anti-parallel to said confining magnetic field, said injected RF energy being phased to couple to said traveling waves with both a phase velocity component and a wave momentum component in the direction of said traveling wave momentum components, and said injected RF energy having a predetermined spectrum so that said traveling waves couple to plasma electrons having velocities in a range $\Delta$, said velocities being substantially three to six times the thermal electron velocity of said plasma and said range being sufficiently broad to produce a raised plateau having width $\Delta$ in the plasma electron velocity distribution so that the plateau electrons provide steady state current to generate a poloidal magnetic field component sufficient for confining said plasma, wherein said RF injection means includes means for coupling to the fast-branch whistler-Alfven wave and to the slow-branch lower-hybrid wave, the electric field of said wave RF energy at the plasma wall having a component substantially perpendicular to the magnetic field confining the plasma, and having a component substantially parallel to the magnetic field confining the plasma, said coupling means comprising an array of rectangular waveguides phased in both the toroidal and poloidal directions, and being slanted with respect to the toroidal magnetic field.

2. Method for generating steady state confining current for a toroidal plasma exceeding the power dissipated in said plasma, comprising the steps of:

preparing a dense, hot toroidal plasma having a confining magnetic field with toroidal and poloidal components, injecting continuous wave RF energy into said plasma to establish spectrum of traveling waves in said plasma, said traveling waves having momentum components substantially either all parallel or all anti-parallel to said confining magnetic field.

said injected RF energy being phased to couple to said traveling waves with both a phase velocity component and a wave momentum component in the direction of said traveling wave momentum components, and said injected RF energy having a predetermined spectrum so that said traveling waves couple to plasma electrons having velocities in a range $\Delta$, said velocities being substantially three to six times the thermal electron velocity of said plasma and said range being sufficiently broad to produce a raised plateau having width $\Delta$ in the plasma electron velocity distribution so that the plateau electrons provide steady state current to generate a poloidal magnetic field component sufficient for confining said plasma, wherein said RF injection step includes the sub-step of coupling said RF energy to the fast-branch whistler-Alfven wave and to the slow-branch lower-hybrid wave, wherein the electric field of said RF energy at the plasma wall has a component substantially perpendicular to the magnetic field confining the plasma, and has a component substantially parallel to the magnetic field confining the plasma, wherein said coupling sub-step for said fast-branch whistler-Alfven wave and said slow-branch hybrid wave comprises the step of coupling said RF energy by way of an array of rectangular waveguides phased in both the toroidal and poloidal directions and being slanted with respect to the toroidal magnetic field.

3. A system for generating steady state confining current for a toroidal plasma exceeding the power dissipated in said plasma, comprising:

means for preparing a dense, hot toroidal plasma having a confining magnetic field with toroidal and poloidal components;

means for injecting continuous wave RF energy into said plasma to establish a spectrum of traveling waves in said plasma, said traveling waves having a momentum components substantially either all parallel or all anti-parallel to said confining magnetic field, said injected RF energy being phased to couple to said traveling waves with both a phase velocity component and a wave momentum component in the direction of said traveling wave momentum components, and said injected RF energy having a predetermined spectrum so that said traveling waves couple to plasma electrons having velocities in a range $\Delta$, said velocities being substantially three to six times the thermal electron velocity of said plasma and said range being sufficiently broad to produce a raised plateau having width $\Delta$ in the plasma electron velocity distribution so that the plateau electrons provide steady state current to generate a poloidal magnetic field component sufficient for confining said plasma, wherein said RF injection means includes means for coupling to the fast-branch whistler-Alfven wave and in which the electric field of the RF energy at the plasma wall is substantially perpendicular to the magnetic field confining the plasma, wherein said coupling means for said fast-branch, whistler-Alfven wave comprises an array of ridged waveguides phased in both the toroidal and poloidal directions.

4. Method for generating steady state confining current for a toroidal plasma exceeding the power dissipated in said plasma, comprising the steps of:

preparing a dense, hot toroidal plasma having a confining magnetic field with toroidal and poloidal components, injecting continuous wave RF energy into said plasma to establish spectrum of traveling waves in said plasma, said traveling waves having momentum components substantially either all parallel or all anti-parallel to said confining magnetic field, said injected RF energy being phased to couple to said traveling waves with both a phase velocity component and a wave momentum component in the direction of said traveling wave momentum components, and said injected RF energy having a predetermined spectrum so that said traveling waves couple to plasma electrons having velocities in a range $\Delta$, said velocities being substantially three to six times the thermal electron velocity of said plasma and said range being sufficiently broad to produce a raised plateau having width $\Delta$ in the plasma electron velocity distribution so that the plateau electrons provide steady state current to generate a poloidal magnetic field component sufficient for confining said plasma, wherein said RF injection step includes the sub-step of coupling said RF energy to the fast-branch whistler-Alfven wave, wherein the electric field of the RF energy at the plasma wall is substantially perpendicular to the magnetic field confining the plasma, wherein said coupling step for said fast-branch, whistler-Alfven wave comprises the step of coupling said RF energy by way of an array of ridged waveguides phased in both the toroidal and poloidal directions.

5. A system for generating steady-state confining current for a toroidal plasma exceeding the power dissipated in said plasma, comprising:

means for preparing a dense, hot toroidal plasma having a confining magnetic field with toroidal and poloidal components, means for injecting continuous wave RF energy into said plasma to establish a spectrum of traveling waves in said plasma, said traveling waves having momentum components substantially either all parallel or all anti-parallel to said confining magnetic field, said injected RF energy being phased to couple to said traveling waves with both a phase velocity component and a wave momentum component in the direction of said traveling wave momentum components, and said injected RF energy having a predetermined spectrum so that said traveling waves couple to plasma electrons having velocities in a range $\Delta$, said velocities being substantially three to six times the thermal electron velocity of said plasma and said range being sufficiently broad to produce a raised plateau having width $\Delta$ in the plasma electron velocity distribution so that the plateau electrons provide steady state current to generate a poloidal magnetic field component sufficient for confining said plasma, wherein said RF injection includes means for coupling to the fast-branch whistler-Alfven wave and to the slow-branch lower-hybrid wave, the electric field of said wave RF energy at the plasma wall having a component substantially perpendicular to the magnetic field confining the plasma, and having a component substantially parallel to the magnetic field confining the plasma, wherein said coupling means for said slow-branch hybrid waves comprises an array of rectangular waveguides phased in the toroidal direction and wherein said coupling means for said fast-branch whistler-Alfven wave comprises an array of ridged waveguides phased in both the toroidal and poloidal directions.

6. Method for generating steady state confining current for a toroidal plasma exceeding the power dissipated in said plasma, comprising the steps of:

preparing a dense, hot toroidal plasma having a confining magnetic field with toroidal and poloidal components, injecting continuous wave RF energy into said plasma to establish spectrum of traveling waves in said plasma, said traveling waves having momentum components substantially either all parallel or all anti-parallel to said confining magnetic field, said injected RF energy being phased to couple to said traveling waves with both a phase velocity component and a wave momentum component in the direction of said traveling wave momentum components, and said injected RF energy having a predetermined spectrum so that said traveling waves couple to plasma electrons having velocities in a range $\Delta$, said velocities being substantially three to six times the thermal electron velocity of said plasma and said range being sufficiently broad to produce a raised plateau having width $\Delta$ in the plasma electron velocity distribution so that the plateau electrons provide steady state current to generate a poloidal magnetic field component sufficient for confining said plasma, wherein said RF injection step includes the sub-step of coupling said RF energy to the fast-branch whistler-Alfven wave and to the slow-branch lower-hybrid wave, wherein the electric field of said RF energy at the plasma wall has a component substantially perpendicular to the magnetic field confining the plasma, and has a component substantially parallel to the magnetic field confining the plasma, wherein said coupling step for said slow-branch hydrid waves comprises the step of coupling said RF energy by way of an array of rectangular waveguides phased in the toroidal direction, and wherein said coupling step for said fast-branch whistler-Alfven wave comprises the step of coupling said RF energy by way of an array of ridged waveguides phased in both the toroidal and poloidal directions.

* * * * *